(12) United States Patent
Varnedoe et al.

(10) Patent No.: US 11,382,307 B2
(45) Date of Patent: Jul. 12, 2022

(54) LIVESTOCK SELF-FEEDER

(71) Applicant: Kane Manufacturing Company, De Moines, IA (US)

(72) Inventors: Joel Varnedoe, Valdosta, GA (US); Dylan Hanks, Adel, GA (US); Garry Childs, Pelham, GA (US); Scott Johnson, Hartford, GA (US)

(73) Assignee: Kane Manufacturing Co., DeMoines, IA (US)

( * ) Notice: Subject to any disclaimer, the term of this patent is extended or adjusted under 35 U.S.C. 154(b) by 10 days.

(21) Appl. No.: 16/801,838

(22) Filed: Feb. 26, 2020

(65) Prior Publication Data

US 2021/0259206 A1 Aug. 26, 2021

(51) Int. Cl.
 *A01K 5/02* (2006.01)
(52) U.S. Cl.
 CPC .................... *A01K 5/0225* (2013.01)
(58) Field of Classification Search
 CPC .. A01K 5/0225; A01K 5/0233; A01K 5/0241; A01K 5/0275; A01K 5/0283
 See application file for complete search history.

(56) References Cited

U.S. PATENT DOCUMENTS

| | | | | |
|---|---|---|---|---|
| 895,165 A * | 8/1908 | Cox | ...................... | A01K 39/012 119/70 |
| 1,104,701 A * | 7/1914 | Parks | ................... | A01K 39/012 119/70 |
| 1,112,068 A * | 9/1914 | Keller | .................. | A01K 39/012 119/70 |
| 1,132,973 A * | 3/1915 | Rappleye | ............ | A01K 39/012 119/52.2 |
| 1,498,220 A * | 6/1924 | Winkler | ............... | A01K 39/012 119/70 |
| 3,487,433 A * | 12/1969 | Fleming | ................. | A01K 61/80 119/51.04 |
| 3,677,230 A * | 7/1972 | Braden | .................. | A01K 61/80 119/51.04 |
| 3,730,142 A * | 5/1973 | Kahrs | .................... | A01K 61/80 119/54 |
| 4,462,338 A * | 7/1984 | Thibault | .............. | A01K 5/0241 119/902 |
| 5,839,389 A * | 11/1998 | Fujii | .................... | A01K 5/0233 119/53 |
| 6,199,511 B1 * | 3/2001 | Thibault | .............. | A01K 5/0241 119/53 |

\* cited by examiner

*Primary Examiner* — Ebony E Evans
(74) *Attorney, Agent, or Firm* — John G. Posa; Belzer P.C.

(57) ABSTRACT

An improved hog/livestock feeder uses a bump cone on a pendulum swivel as opposed to rotary motion. A support structure suspends a feed hopper directly above a feed pan. A bump cone swings with a pendulum motion within a funnel in the hopper. The lower edge of the bump cone is accessible between the open bottom of the hopper and the upper rim of the feed pan, such that when an animal nudges the bump cone, a gap between the hopper funnel and bump cone widens, and feed falls from the hopper and into the feed pan. The device enabling the bump cone to swing a pendulum motion may be a spring, a multi-axis joint, or a length of flexible material. A raised feed diverter structure may extend upwardly from the bottom of the feed pan, and the bump cone may be perforated to further distribute the feed.

6 Claims, 5 Drawing Sheets

LIVESTOCK SELF-FEEDER

FIELD OF THE INVENTION

This invention relates generally to livestock feeders and, in particular, to a simple yet effective device that utilizes pendulum action for self-feeding.

BACKGROUND OF THE INVENTION

Traditional hog feeders use a rotating mechanism which the animal sets into motion by pushing a protruding wing around a central axis. One such feeder is described in U.S. Pat. No. 4,353,329, entitled "Rotary Self Feeder." This prior-art feeder comprises a base member with a surface for receiving feed, and a feed-containing hopper positioned above the base member. The hopper has a bottom aperture for allowing feed to flow into said base member receptacle. A plurality of support members connecting the base member and the hopper and are also adapted for separating feeding animals. A feed wheel includes an upright member rotatably mounted in the receptacle. The feed wheel includes a lower portion with a spoke extending from the upright member which is movable by an animal to rotate the feed wheel. An agitating rod that extends from the upright member agitates feed within the hopper as the feed wheel is rotated.

While the product described above and other feeders like it have been in service for many years, the mechanism is overly complicated and cumbersome, making transport difficult and on-site assembly problematic.

SUMMARY OF THE INVENTION

This invention resides in an improved hog feeder with the understanding that the design may be modified for other livestock through appropriate engineering modifications. In contrast to previous designs requiring the animal to rotate a feed wheel, the instant invention instead uses a bump cone on a pendulum swivel to achieve a simpler design with fewer component parts that may be assembled on site, by the customer, if need be.

A self-feeder according to the invention includes a hopper adapted to hold animal feed, the hopper including an upper portion with an open top and lower portion with an open bottom. A support structure suspends the hopper directly above a feed pan. A hopper funnel with a downward opening is disposed within the lower portion of the hopper, and a bump cone swings with a pendulum motion within the downward opening of the funnel. The lower edge of the bump cone is accessible between the open bottom of the hopper and the upper rim of the feed pan, such that when an animal nudges the lower edge of the bump cone, a gap between the hopper funnel opening and bump cone widens, allowing feed to fall from the hopper and into the feed pan.

The device enabling the bump cone to swing a pendulum motion may be implemented with a spring, a multi-axis joint, or a length of flexible material such as a rubber or rubber-like polymeric material. The preferred embodiment further includes a raised feed diverter structure extending upwardly from the bottom of the feed pan. The bump cone also preferably includes sidewalls with apertures to further distribute the feed.

DETAILED DESCRIPTION OF THE PREFERRED EMBODIMENTS

Figure 1:
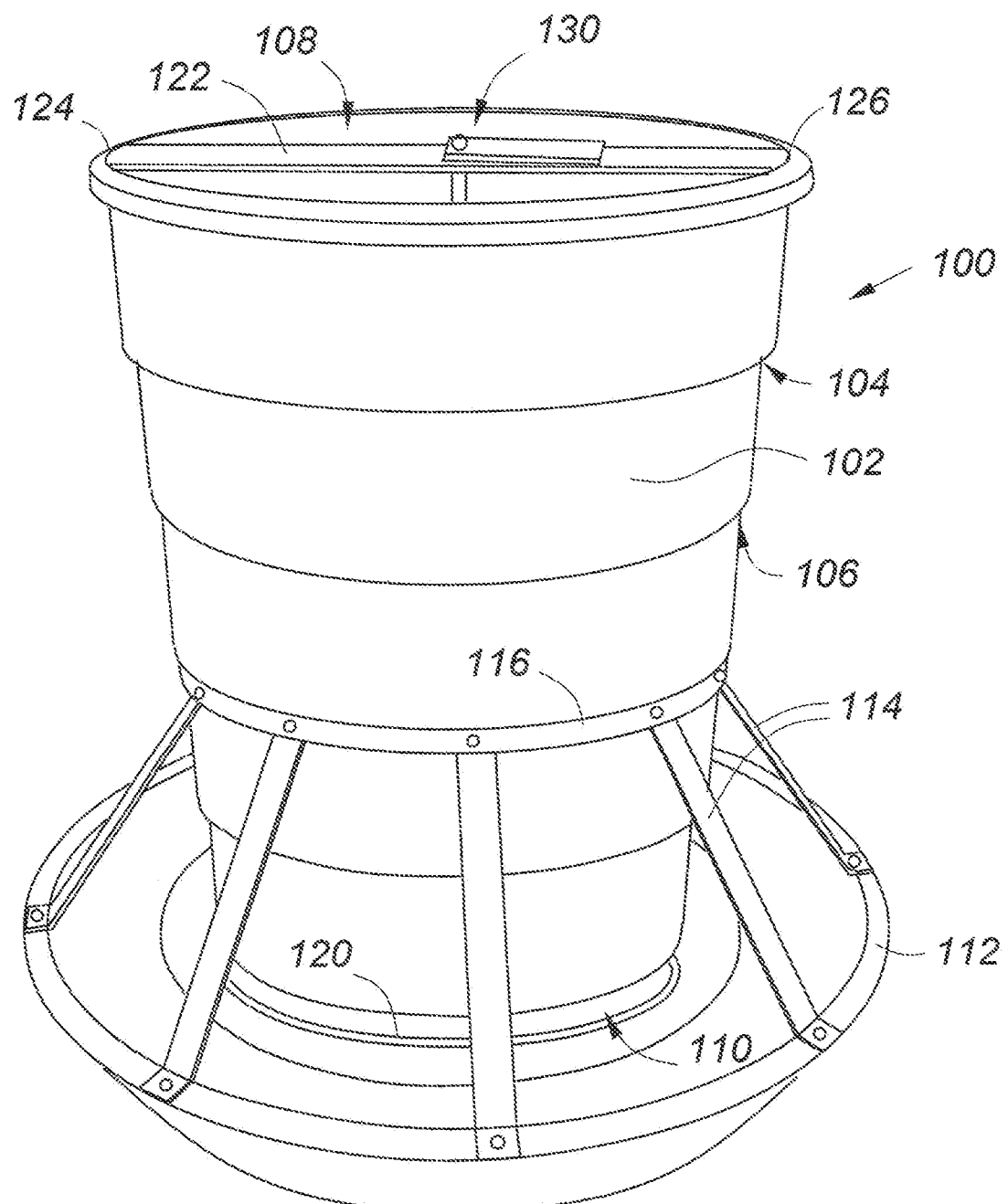
FIG. 1 is a perspective view drawing of a preferred embodiment of the invention.

Now making reference to the accompanying drawing, FIG. 1 depicts a preferred embodiment of the invention. The feeder 100 includes a hopper 102 constructed of molded plastic such as HDPE with optional ribs 104, 106 to add rigidity. The hopper 102 may assume a funnel shape as shown, between an upper opening 108 and a lower opening 110. The hopper may be of any reasonable size. For example, the upper and lower openings may be in the range of 12-36 inches, and the hopper may have a capacity on the order of 25-100 gallons. The hopper would be filled with dry, granular feed.

The hopper 102 is secured to a feed pan 112 by way of a support ring 116 and multiple support bars 114 such that the hopper 112 is suspended at a predetermined distance above the feed pan 112. Like the hopper, the feed pan 112 is constructed from molded plastic, whereas the support ring 116 and bars 114 are metal, preferably stainless steel. The feed pan includes a truncated feed spreader cone 113, which may be separate or, more preferably, molded into the feed pan 112. The lower ends of the support bars 114 are fastened to the outer rim of the feed pan 112 with suitable connectors, and the support bars 114 are sufficiently spaced apart to permit animals to operate the feeder as discussed below.

An upper spreader bar 122 spans the upper opening 108 of the hopper 112. An adjuster rod 140 penetrating through a central portion of the spreader bar 122 includes a length adjustment structure 130 described with reference to subsequent figures. The two ends of the upper spreader bar 122 are secured to respective upper edges of the hopper 112 at points 124, 126 with suitable fasteners. The upper spreader bar 122, rod 140 and adjustment structure 130 are metal, preferably stainless steel.

Figure 2:
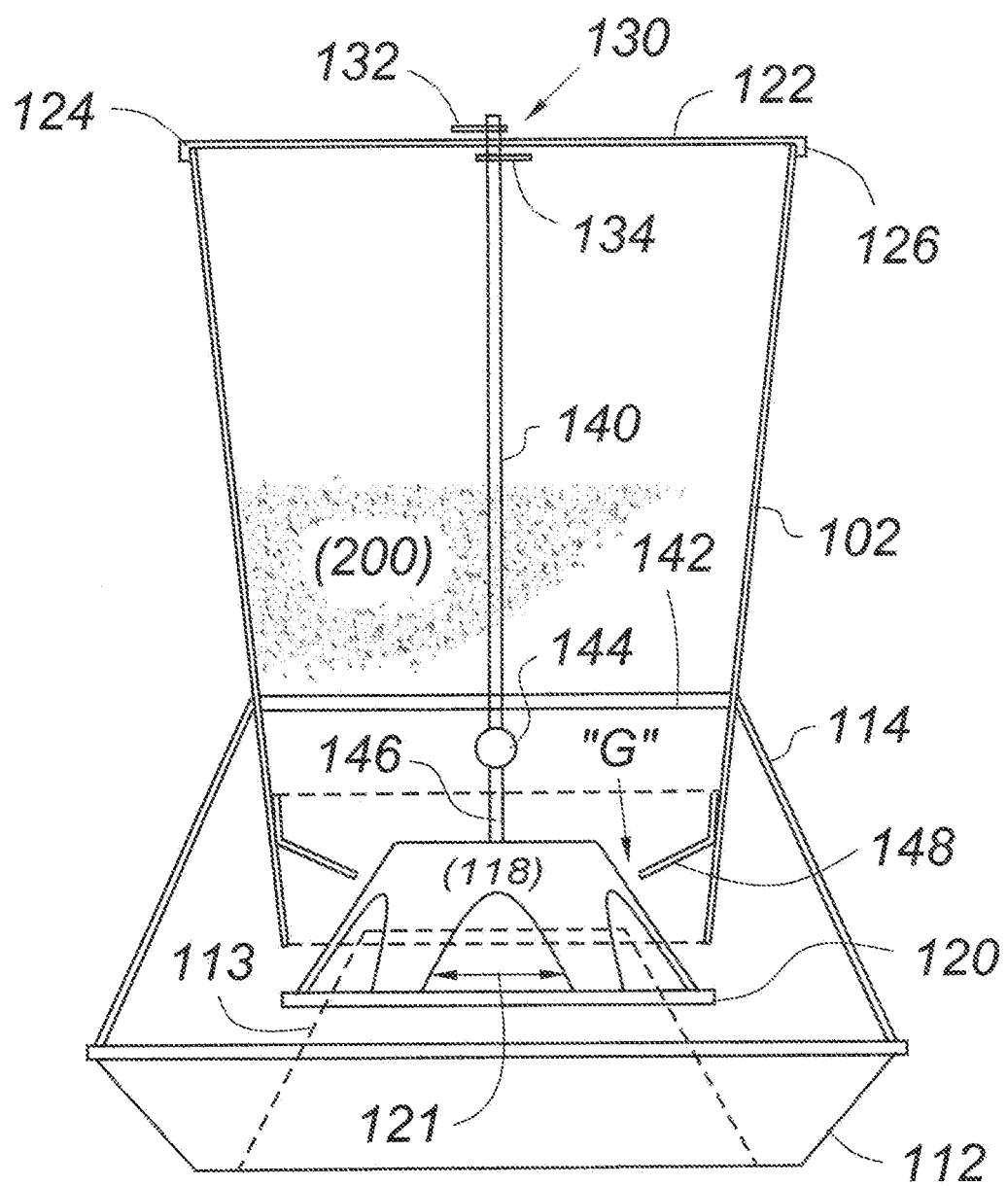
FIG. 2 is a side view in partial cross section illustrating internal components.

FIG. 2 is a side view in partial cross section illustrating internal components. Optional ribs 104, 106 are not shown. The adjuster rod 140 extends downwardly through feed 200, and through an internal rod support 142. The ends of the rod support 142 are coupled to the inner walls of the hopper 112, and may use the same fasteners used to connect the support ring 116 to the outer wall of the hopper 112. The upper spreader bar 122 and rod support 142 maintain the adjuster rod 140 oriented generally vertically within the hopper 112. The lower end of the adjuster rod 140 is coupled to a device 144 which, in turn, is coupled to a bump cone 118 through rod 146. The bump cone 118 preferably includes an outer bump ring 120.

A hopper funnel 148 is fastened to the inner wall of the hopper 112. The lower portion of the hopper funnel 148 define a circular opening, such that a circular gap "G" is established between the circular opening of the hopper funnel 148 and the outer wall of the bump cone 118. The adjustment mechanism 130 at the upper end of the adjuster rod 140 may include two handles 132, 134, one above and one below the upper spreader bar 122. The handles may be moved up and down the adjuster rod 140, causing the bump cone 118 to move up and down within the opening in the hopper funnel 148. Prior to use, the gap "G" is adjusted to maintain feed 200 within the hopper 102 unless and until an animal nudges the bump cone 118. The larger the gap, the larger the granular size of the feed may be used.

Figure 3:
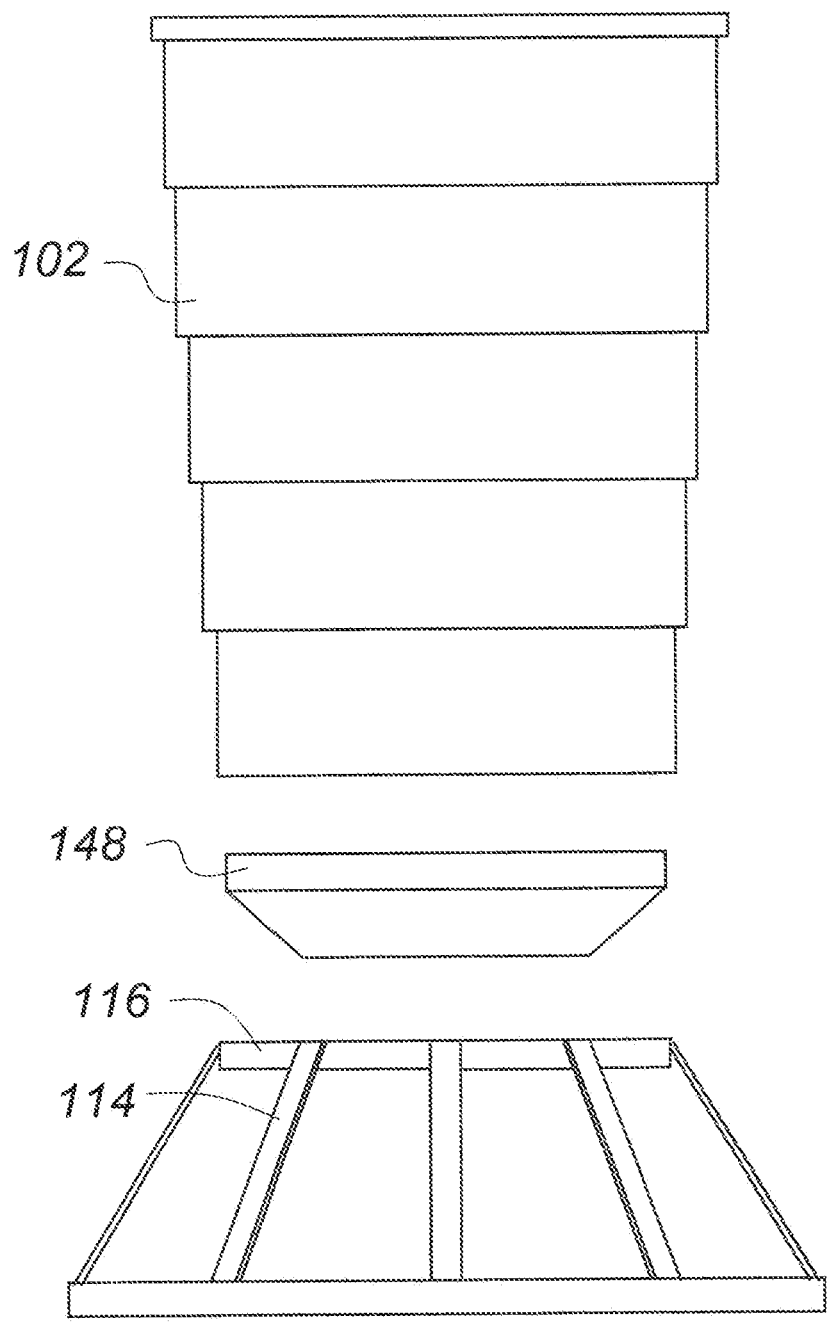
FIG. 3 is an exploded view showing one subset of the components.
Figure 4:
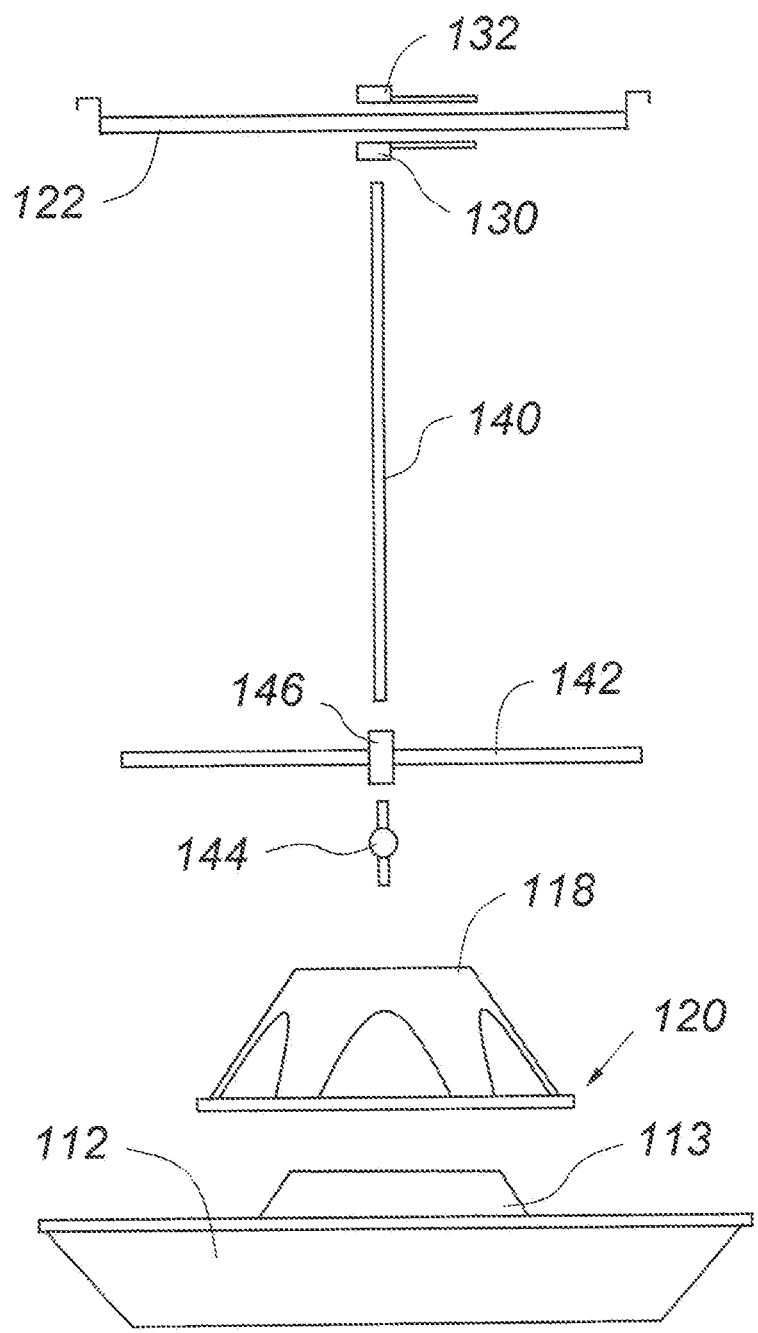
FIG. 4 is an exploded view showing a different subset of the components.
Figure 5:
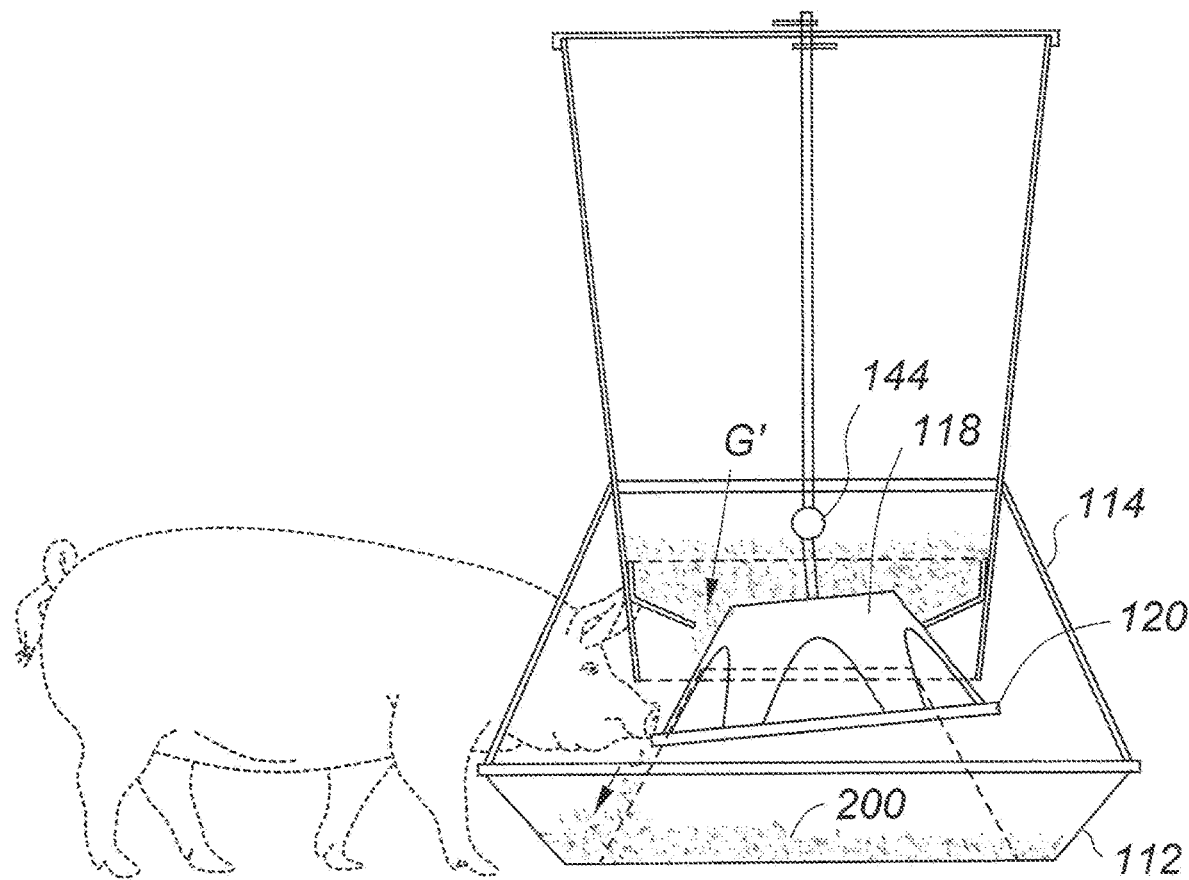
FIG. 5 is a drawing that illustrates an animal operating the feeder.

FIG. 3 is an exploded view showing one subset of the components; FIG. 4 is an exploded view showing a different subset of the components; and FIG. 5 is a drawing that illustrates an animal operating the feeder. Note that as the animal nudges the bump cone 118 through the bump ring 120, the feed 200 falls through larger gap G' into the feed pan 112. To assist with distribution, the feed may fall through cutouts 121 in the bump ring 118, striking the outer walls of the truncated feed spreader cone 113 before settling in the feed pan 112.

The device 144 may be implemented with different alternative mechanisms so long as a pendulum movement of the bump ring is achieved in use. For example, the device 144 may be implemented with a coil spring or, alternatively, a ball joint may be used. As a further alternative, the device 144 may be implemented with a length or section of flexible material such as rubber or a rubber-like material. As with other metal components, stainless steel is preferred due to outdoor placement of the feeder.

In summary, the bump feeder described herein radically changes the mechanism for delivering feed to hogs in a rotary feeder. Whereas traditional rotary hog feeders use a rotating mechanism which the animals set into motion by pushing a protruding wing around a central axis, the bump feeder achieves feed delivery by way of a "pendulum" mechanism on a central axis. The new design has a number of advantages. The design does not require any assembly by the customer, and the mechanism is more efficient for delivering feed. The hog (or other animal) simply nudges the ring with its nose, releasing the feed into the feed pan 112. Current designs require that the hog push the wings along the circumference of the feeder. This can be a challenge, especially given the presence of the protruding hole separators.

The invention claimed is:

1. An animal feeder, comprising:
   a hopper adapted to hold animal feed, and wherein the hopper includes an upper portion with an open top and lower portion with an open bottom;
   a feed pan having an upper rim and a bottom surface;
   a support structure between the hopper and the feed pan, such that the open bottom of the hopper is suspended directly above the feed pan;
   wherein the support structure comprises a plurality of spaced-apart elongated ribs extending upwardly from the upper rim of the feed pan to the hopper;
   a hopper funnel disposed within the lower portion of the hopper, the hopper funnel including a funnel opening with a diameter, D1;
   a bump cone having an upper portion, a lower edge, and an outer surface including a diameter, D2;
   wherein the bump cone is suspended in the hopper so as to create a continuous circumferential gap G between D1 and D2;
   wherein the bump cone is suspended in the hopper with a device enabling the bump cone to swing a pendulum motion relative to the hopper funnel; and
   wherein the lower edge of the bump cone is accessible between the open bottom of the hopper and the upper rim of the feed pan, such that when an animal nudges the lower edge of the bump cone from any direction between any of the elongated ribs, the gap G widens, allowing feed to fall from the hopper and into the feed pan.

2. The animal feeder of claim 1, wherein the device enabling the bump cone to swing a pendulum motion is implemented with a spring.

3. The animal feeder of claim 1, wherein the device enabling the bump cone to swing a pendulum motion is implemented with a multi-axis joint.

4. The animal feeder of claim 1, wherein the device enabling the bump cone to swing a pendulum motion is implemented with a length of flexible material.

5. The animal feeder of claim 1, further including a diverter structure extending upwardly from the bottom of the feed pan.

6. The animal feeder of claim 1, wherein the bump cone includes sidewalls with apertures penetrating therethrough.

* * * * *